United States Patent [19]

Shafer et al.

[11] 4,385,371

[45] May 24, 1983

[54] APPROXIMATE CONTENT ADDRESSABLE FILE SYSTEM

[75] Inventors: Philip E. Shafer, Holmes; George H. Barnes, Wayne, both of Pa.

[73] Assignee: Burroughs Corporation, Detroit, Mich.

[21] Appl. No.: 232,476

[22] Filed: Feb. 9, 1981

[51] Int. Cl.³ .............................................. G11C 13/00
[52] U.S. Cl. ....................................... 365/49; 365/230
[58] Field of Search ......................... 365/49, 189, 230

[56] References Cited

U.S. PATENT DOCUMENTS 4,159,538  6/1979  Motsch ................................. 365/49

*Primary Examiner*—Joseph A. Popek
*Attorney, Agent, or Firm*—L. C. Brenner; M. L. Young; K. R. Peterson

[57] ABSTRACT

In an approximate content addressable storage system data words are stored in a two dimensional storage array with each data character therein stored in a particularly associated storage row and each data word individually and sequentially character-by-character stored column-by-column. In searching the array for a particular word each storage row associated with a character in the search word is accessed in a manner biased to that character's position in the search word so that the search for all characters occurs effectively in parallel. A searched for character located in its proper position is given maximum value with decreasing value accorded to searched for characters detected one or more positions removed from the proper position in the search word. The value derived for each character is totalled with similar values derived from all other characters in the search word thus arriving at a value indicative of the approximateness of a stored word with the search word. A threshold detector may be employed to remove detection of stored words only remotely approximate to the search word.

4 Claims, 4 Drawing Figures

| CLOCK | SHIFT REGISTER | POSITION VALUE |
|---|---|---|
| 1 | 0 0 0 0 0 0 0 1 | 0 |
| 2 | 0 0 0 0 0 0 1 0 | 1 |
| 3 | 0 0 0 0 0 1 0 0 | 2 |
| 4 | 0 0 0 0 1 0 0 0 | 3 |
| 5 | 0 0 0 1 0 0 0 0 | 4 |
| 6 | 0 0 1 0 0 0 0 0 | 3 |
| 7 | 0 1 0 0 0 0 0 0 | 2 |
| 8 | 0 1 0 0 0 0 0 0 | 1 |
| 9 | 1 0 0 0 0 0 0 0 | 0 |

_Fig.3_

|  |  | 1 | 2 | 3 | 4 | 5 | 6 | 7 | 8 | 9 |
|---|---|---|---|---|---|---|---|---|---|---|
| R O W | S | 0 | 1 | 2 | 3 | 4 | 3 | 2 | 1 | 0 |
|  | H | 0 | 1 | 2 | 3 | 4 | 3 | 2 | 1 | 0 |
|  | A | 0 | 1 | 2 | 3 | 4 | 3 | 2 | 1 | 0 |
|  | F | 1 | 0 | 1 | 2 | 3 | 4 | 3 | 2 | 1 |
|  | E | 0 | 2 | 3 | 4 | 3 | 4 | 3 | 2 | 1 |
|  | R | 1 | 0 | 1 | 2 | 3 | 4 | 3 | 2 | 1 |
| TOTAL |  | 1 | 5 | 11 | 17 | 21 | 21 | 13 | 9 | 3 |

STORED WORD = SHAEFER
SEARCH WORD = SHAFER

_Fig.4_

APPROXIMATE CONTENT ADDRESSABLE FILE SYSTEM

BACKGROUND OF THE INVENTION

The present invention relates generally to the field of content addressable file systems wherein a file, index, directory, memory or the like is searched for storage of a particular data character, word, message or the like. For example, a directory within a data processing system may be searched for the storage (and location in storage) of the name "Shaefer". Once found in the directory, associated data (such as its location in the directory or otherwise) will point to an address in an associated memory wherein more detailed information about "Shafer" is stored such as home address, age, sex, criminal record, etc. However, if through human, mechanical, or electrical error the directory is storing the incorrect name "Shaefer" while a search therethrough is made for the name "Shafer" no match will be found and the actual information pertaining to "Shafer" stored in the associated memory will not be located. Thus there exists the need in content addressable systems to determine and locate approximate matches as well as entire and/or true matches.

The present invention relates particularly to approximate content addressability. For the above example, the present invention includes the method and apparatus for detecting the stored word "Shaefer" with a searching word "Shafer".

It is known in the prior art how to locate approximate matches by looking for partial matches. For example, a search in a directory for all names beginning with "Sha" would locate both "Shafer" and "Shaefer" if stored therein. Such a partial search is biased (i.e., works best) for a partial match occuring at the beginning of a search word and retrieves stored words that may partially match but otherwise be totally different. Total failure or at least much difficulty is encountered while searching for a match with a stored word that has an erroneously added or deleted character, particularly if such occurs as the first character or letter of the search word.

It is therefore an object of the present invention to provide an improved approximate content addressable file system.

It is another object of the present invention to provide an approximate content addressable file system equally effective for partial matches occurring anywhere within the searched for and stored data.

It is another object of the present invention to provide an approximate content addressable file system effective for searching stored data having erroneously added or deleted data segments or characters.

SUMMARY OF THE INVENTION

The above and other objects of the invention are realized by arranging a two dimensional storage array so that each data character has a particularly associated storage row and each data word is individually and sequentially character-by-character stored column-by-column with each character of each word identifying its presence by a mark at the address composed of the row associated with that character and the column corresponding to the position of that character in the stored word. When the storage array is to be searched for a particular word each storage row associated with a character in the search word is addressed in a manner biased to that character's position in the search word so that the search for all characters occurs effectively in parallel. A searched for character located in its proper position is given maximum weight or value with decreasing value accorded to searched for characters detected one or more positions removed from the proper position in the search word. The value of each searched for character is totaled with similar values derived from all other characters in the search word thus arriving at a value indicative of the approximateness of a stored word with the search word. A threshold detector may be employed to remove detection of stored words only remotely approximate to the search word.

The system configuration and operational details given above have been presented in simplified form. Other objects, features, and advantages of the invention will be apparent from the following description of the preferred embodiment of the invention and the accompanying drawings thereof.

BRIEF DESCRIPTION OF THE DRAWINGS

FIG. 3 is an illustration of the weighing operation for the apparatus of FIG. 2; and FIG. 4 is an illustration of the embodiment of FIG. 1 in operation.

DETAILED DESCRIPTION OF THE PREFERRED EMBODIMENT

Figure 1:
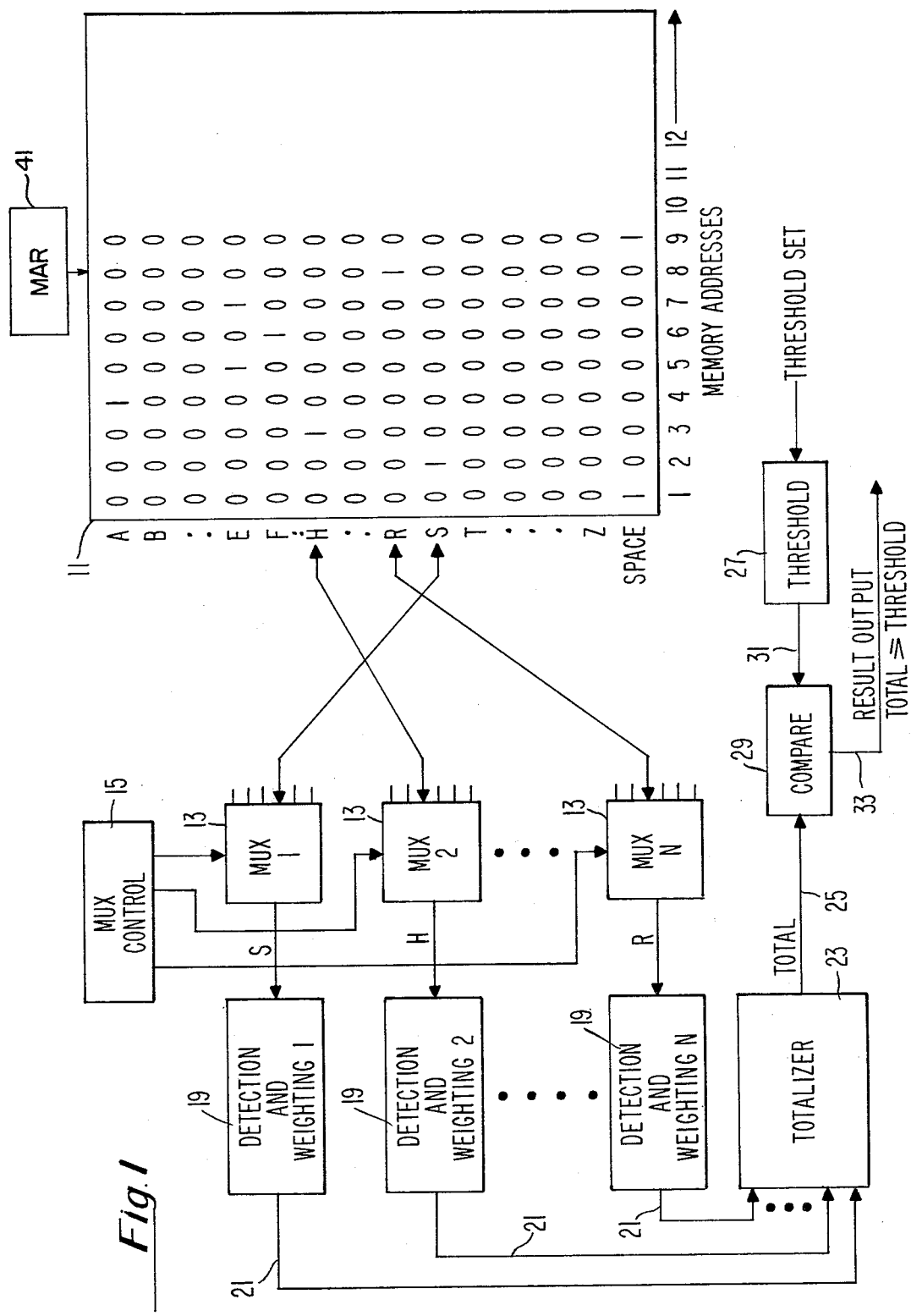
FIG. 1 is an illustration of a data storage arrangement and searching mechanism for embodying the present invention.

In the preferred embodiment of the invention as shown in FIG. 1, data is stored in a two dimensional storage array. The storage array 11 has rows identified as A through Z and memory addresses identified numerically from 1 and increasing incremently column-by-column. For purposes of illustration, and discussion, the storage array 11 is shown storing the name "Shaefer". To access the storage array 11, a plurality of multiplex units 13 are employed identified as MUX 1 through MUX N. The number N being equal to or greater than the length of the largest search word. Each multiplex unit 13 is individually connected to a row A through Z or SPACE in the storage array 11 as directed by a multiplex control unit 15. For example, if the storage array 11 is to be searched for the word "Shafer" the multiplex control unit 15 directs MUX 1 to be associated with row S of the storage array 11, MUX 2 to be associated with row H of the storage array 11, NUX N to be associated with the row R in the storage array 11 wherein MUX in this specific example would be equal to 6. The output of each multiplex unit 13 is fed to an associated detecting and weighing unit 19. In operation the storage array 11 is searched by stepping through the column addresses incrementally. As will be detailed hereinafter, each detection and weighing station 19 is in effect looking for specific data from an associated row in the storage array 11 at a specific column address. Data detected at its desired position or address is given a maximum value and data detected removed an address or position from its desired detected address or position is given less value. In the output 21 of the detection and weighing units 19 carry a position value to a totalizer 23 which sums the position values outputted by all the detection and weighing units 19. The output 25 of the totalizer represents the total position value of all the searched for data in the storage array 11. The value of the totalizer output 25 is representative or indicative of the approximate closeness of stored data in the storage array 11 to the searched for data as presented to the multiplex control 15. A threshold setting is inputted to a threshold register 27 which outputs a value indicating a stored approximation value below which information is not desired. The threshold set value is set by the user according to the degree of accuracy of the search desired and may be computed by a search program which is outside the scope of this invention or such a value may be supplied automatically by a search program. A comparator 29 compares the value on the totalizer output 25 with the value on the threshold output 31 to generate a resultant output on result output line 33 whenever the value on the totalizer output 25 exceeds the set value of threshold output 31. Such an indication designates an acceptable approximation between the stored data and the searched for data.

Figure 2:
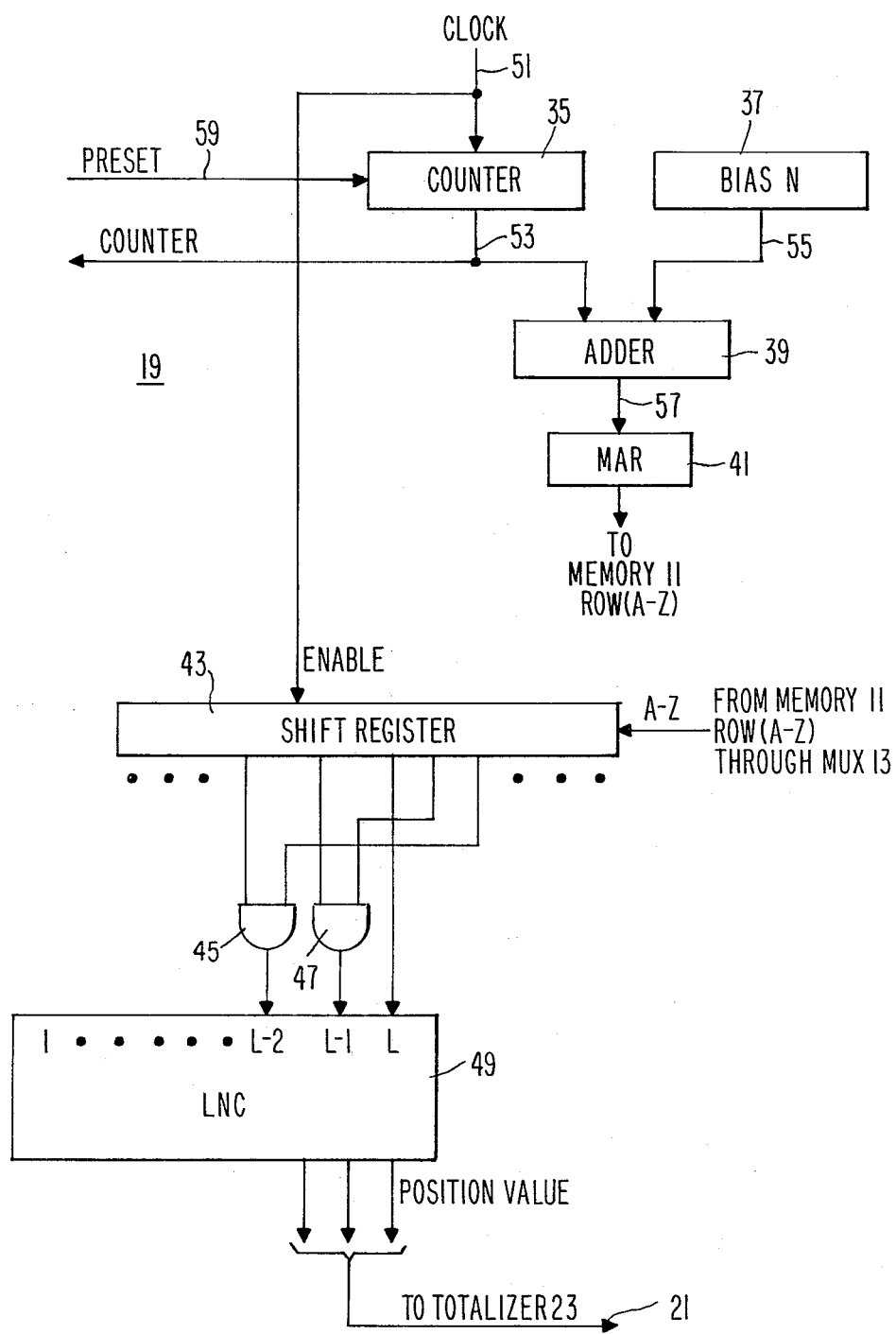
FIG. 2 is a diagram of a detection and weighing apparatus used in the embodiment of FIG. 1.

A better understanding of the shown and preferred embodiment of the present invention and the operation thereof is facilitated through an examination of FIG. 2 which is a diagram of the detection and weighing units 19. Each detection and weighing unit 19 includes a counter 35, a bias register 37, an adder 39, a memory address register 41, a shift register 43, at least two AND gates 45 and 47, and a largest number chip 49.

In operation a clock pulse is applied on line 51 to the counter 35 and the shift register 43. The output 53 of the counter is provided with the adder 39 and is also outputted for use by the above-referred to search program. The adder 39 is also provided with an output 55 from bias N register 37. The value stored in bias N register 37 is related directly to the position of the character in the word being searched. For example, if a search word "Shafer" is employed, the bias N register 37 would be set to 1 for the value S, 2 for the value H, three for the value A, four for the value F, five for the value E and six for the value R. The output 57 of the adder 39 is provided to the memory address register 41 which addresses the particular row associated with bias N. By introducing the bias in this fashion all of the characters of the search word are aligned to be examined together. The examination or search for the presence of a character is accomplished through the shift register 43 and associated AND gates 45 and 47 and the largest number chip 49, The largest number chip 49 is just a priority encoder such as the Texas Instruments encoder SN54147 disclosed in Texas Instruments Bulletin No. DL-S 7711727 issued October 1976 and revised August 1977.

With reference to FIG. 3, it can be seen that as a character identified as a logical 1 is clocked through the shift register 43, the position value increases as that character approaches the center of the shift register 43 and decreases on either side thereof. The position valuing is accomplished through the connection of the AND gates 45 and 47 which make the operation of the shift register symmetrical on the center value and the operation of the largest number chip 49 which outputs a value, normally in binary format, indicating the position of the most significant bit inputted which is a logical 1. Thus the largest number chip does not respond to the number of logical 1's inputted or their binary or other possible value indications but it responds only to the position of the logical 1 and outputs a value thereof. The circuitry of the AND gates 45 and 47 make the shift register 43 symmetrical about the center thereby creating the operation wherein the center position is given the highest position value. In the search mode, the effect is that a character located by the presence of a logical 1 in the center of the shift register 43 at a particular clock pulse indicates that that character is located exactly where it is searched for and it is given the highest position value. If the character is located one clock pulse or position removed from the center of the shift register 43 then it is given the lower value and so on as it is removed from the center position of the shift register 43 down to the value zero where the character is located either in the end positions of the shift register 43 or beyond. The position value outputted by the largest number chip 49 is outputted on line 21 and with reference again now to FIG. 1, it can be seen that all the totalizer totals the values of all of the detection and weighing units 19 to generate an output on total line 25 which is compared with threshold from threshold circuit 27 as outputted on line 31 to generate a result when the total on line 25 exceeds the threshold on line 31. The result output 33 indicates that a stored word has been found which is approximate enough to the search word to warrant further investigation. The position or location of a stored word in the storage array 11 is identified by the counter 35, see FIG. 2. Also, with reference to FIG. 2, it is noted that the counter 35 may be preset by present line 59. The preset line 59 merely allows the storage array 11 to be searched at any point in the middle thereof rather than searching through the whole storage array 11 on every search. This may be useful for example were words are stored in the storage array in alphabetical order and words starting only with a particular letter are desired to be searched. For example, if the search word is "Shafer", it may be determined by the user that there is no interest in finding a word stored as "Hafer" even though that word is quite approximate to the search word "Shafer". On the other hand, the user may wish to determine or locate all words which are approximate to a search word and would then preset the counter to zero and search the entire storage array 11.

A specific example of operation when a stored word approximates a search word is illustrated in FIG. 4 for a search word "Shafer" and a stored word "Shaefer". FIG. 4 is an illustration in tabular format wherein rows S, H, A, F, E, R, represent the so designated rows of the storage array 11 and the columns 1 through 9 represent the addresses of the storage array 11 as they are clocked incrementally. For references purposes also, it is noted that in FIG. 1 the word shown stored in the storage array 11 is also "Shaefer". It can be seen that a logical 1 represents the presence of a character and a logical zero represents the absence of the character. The characters are aligned by the bias N register 37 shown in FIG. 2 and described above so that the row S would receive bias 1, H receives bias 2, and so on through to row R which receives a bias of 6. By examining the stored word against the search word, it can be seen that the stored word has the same first three letters as the search word, those being "SHA". Further the stored word and the search word have the same last three letters, those being "FER". Thus, the value for "SHA" are indicated in FIG. 4 as being the value 4 at the clock pulse or address location 5. Since the last three letters of the stored word are misplaced by one clock pulse or one address, the value 4 for the letters "FER" occurs at the clock or address location 6 as shown in FIG. 4. Other values are determined as described above with particular reference to FIG. 3. The total for all of the search word "SHAFER" are shown in FIG. 4 as 1, 5, 11, 17, 21, 21, 13, 9, and 3. The total as shown in FIG. 4 is in essence the total that would be generated by the totalizer 23 and outputted on total line 25 as shown in FIG. 1. An exact match between the search word and stored word for a word having 6 characters would be 4×6 or 24. It can be seen that the value total of 21 is quite close and indicates a fairly approximate match. Unless an exact match was required, the threshold setting of threshold circuit 27 would be set, say for example to 20 or below, and therefore the comparator 29 as shown in FIG. 1 would output a result on output resultant line 33 indicating an approximate match between the stored word "SHAEFER" and the searched word "SHAFER". As described above, the storage array 11 represents a directory and therefore would point to a location in a secondary and larger memory wherein detailed information regarding "SHAEFER" would be stored.

It is realized that additional modifications and features may be added to the preferred embodiment described above and other alternate embodiments of the present invention without departing from the scope thereof. For example, it can be seen from FIG. 1 that the storage array 11 represents a very sparse matix and that storage compression techniques sometimes employed with the storage of sparse matrices may be utilized with the standard trade-off of additional logic and complexity for the savings of considerable memory space. Further, the threshold setting and comparing techniques may be enhanced by the employment of peak detectors and/or other logic additions to indicate the closest match as well as only a match above a certain threshold.

Also the bias of character positions could occur in biasing registers associated with the storage array 11 rather than associated with each detection and weighing unit 19. The shift registers 43 can be lengthened or shortened as desirable for particular applications.

Thus while a particular embodiment of the present invention has been described and illustrated, it will be apparent to those skilled in the art that further changes and modifications may be made therein without departure from the spirit and scope of the invention as claimed.

What is claimed is:

1. An approximate content addressable apparatus comprising:
   storage means for storing indicators for a plurality of data segments, each data segment therein having a plurality of addressable data elements, each indicator being stored at an address indicative of the identity and position of the data element within its associated data segment;
   means for sequentially accessing said indicators for a plurality of selected data elements from said storage means, a selected pattern of said plurality of selected data elements forming a selected data segment, said accessing being displaced in time or location in accordance with said selected data element pattern for said selected data segment so that if said selected data segment is stored in said storage means, all of its selected indicators in said plurality thereof will be accessed in parallel; and
   means for assigning a value indicating deviation from said parallel access for each selected data element in said plurality thereof and for totalling said values to generate a total value indicative of the approximateness of each stored data segment in said plurality thereof with said selected data segment.

2. The approximate content addressable apparatus according to claim 1 wherein each data segment in said plurality thereof is a data word and each data element in said plurality thereof is a data character.

3. An approximate addressable method comprising the steps of:
   storing indicators for a plurality of data segments, each data segment therein having a plurality of addressable data elements, each indicator being stored at an address indicative of the identity and position of the data element within its associated data segment;
   sequentially accessing a plurality of selected data elements from said plurality of stored data elements, a selected pattern of said plurality of selected data elements forming a selected data segment, said accessing being displaced in time or location in accordance with said selected data element pattern of said selected data segment so that its said selected data segment is stored, all of its selected indicators in said plurality thereof will be accessed in parallel;
   assigning a value indicating deviation from said parallel access for each selected data element in said plurality thereof; and
   totalling said values to generate a total value indicative of the approximateness of each stored data segment in said plurality thereof with said selected data segment.

4. The approximate content addressable method according to claim 3 wherein each data segment in said plurality thereof is a data word and each data element in said plurality thereof is a data character.

* * * * *